(12) United States Patent
Kweon et al.

(10) Patent No.: US 11,182,701 B2
(45) Date of Patent: Nov. 23, 2021

(54) POWER TRANSFORMER ASSET MANAGEMENT DEVICE AND METHOD THEREFOR

(71) Applicant: KOREA ELECTRIC POWER CORPORATION, Naju-si (KR)

(72) Inventors: Dong-Jin Kweon, Daejeon (KR); Byoung-Soo Joo, Daejeon (KR); Yong-Beum Yoon, Daejeon (KR)

(73) Assignee: KOREA ELECTRIC POWER CORPORATION, Naju-si (KR)

(*) Notice: Subject to any disclaimer, the term of this patent is extended or adjusted under 35 U.S.C. 154(b) by 220 days.

(21) Appl. No.: 16/490,808

(22) PCT Filed: Aug. 4, 2017

(86) PCT No.: PCT/KR2017/008459
§ 371 (c)(1),
(2) Date: Sep. 3, 2019

(87) PCT Pub. No.: WO2018/186537
PCT Pub. Date: Oct. 11, 2018

(65) Prior Publication Data
US 2019/0392360 A1   Dec. 26, 2019

(30) Foreign Application Priority Data
Apr. 4, 2017   (KR) .................. 10-2017-0043693

(51) Int. Cl.
*G06Q 10/06* (2012.01)
*G06Q 50/06* (2012.01)
(Continued)

(52) U.S. Cl.
CPC ......... *G06Q 10/06* (2013.01); *G05B 23/0245* (2013.01); *G05B 23/0264* (2013.01); *G06Q 50/06* (2013.01); *G06Q 50/10* (2013.01)

(58) Field of Classification Search
CPC ............ G05B 23/0245; G05B 23/0264; G05B 23/0283; G06Q 10/06; G06Q 50/06; G06Q 50/10
(Continued)

(56) References Cited

FOREIGN PATENT DOCUMENTS

JP   2006-343974 A   12/2006
JP   2008-066435 A   3/2008
(Continued)

OTHER PUBLICATIONS ip.com: "Method and device for managing both technical performance and financial information of transformers", CN 102663535 A Published on Sep. 12, 2012.*
(Continued)

*Primary Examiner* — John H Le
(74) *Attorney, Agent, or Firm* — Foundation Law Group, LLP

(57) ABSTRACT

The present invention relates to a power transformer asset management device and a method thereof, the device according to the present invention including: a full cycle database managing full cycle data of a power transformer; a physical performance evaluation unit performing physical performance evaluation that calculates a health index by analyzing and weighting life information, a failure ratio, operation history, and status information of a preventive diagnosis system from the full cycle data; a risk evaluation unit performing risk evaluation by generating a risk matrix using the physical performance evaluation result; an economic evaluation unit performing economic evaluation by evaluating costs over a full cycle of the power transformer; and an asset management unit establishing an investment plan for replacing the power transformer according to a maintenance priority of the power transformer determined (Continued)

using the physical performance evaluation result, the risk evaluation result, and the economic evaluation result.

18 Claims, 3 Drawing Sheets

(51) Int. Cl.
  *G06Q 50/10* (2012.01)
  *G05B 23/02* (2006.01)
(58) Field of Classification Search
  USPC .................................................. 702/184, 189
  See application file for complete search history.

(56) References Cited

FOREIGN PATENT DOCUMENTS

| | | |
|---|---|---|
| JP | 2009-170594 A | 7/2009 |
| KR | 10-2011-0046091 A | 5/2011 |
| KR | 10-1160775 B1 | 6/2012 |

OTHER PUBLICATIONS ip.com: "Power transformer economic life prediction method based on life data", CN 104484723 A Published on Apr. 1, 2015.* ip.com :"Risk evaluation system, risk evaluation method, its program, and its recording medium for power distribution facility", JP 2006-343974 A Published on Dec. 21, 2006.* ip.com: "Remaining life assessment apparatus for power transformer", JP 2008-66435 A Published on Mar. 21, 2008.* ip.com: "System and method for evaluating integrity of power transformer", KR 10-1160775 B1 Published on Jun. 28, 2012.*

Sun et al., "Recent Trends in Power Equipment Maintenance Technology," Instrumentation Technology, May 2014, pp. 103-109.

* cited by examiner

POWER TRANSFORMER ASSET MANAGEMENT DEVICE AND METHOD THEREFOR

CROSS-REFERENCE TO RELATED APPLICATION(S)

This application claims the benefit under 35 U.S.C. Section 371, of PCT International Application No. PCT/KR2017/008459, filed on Aug. 4, 2017, which claimed priority to Korean Patent Application No. KR 10-2017-0043693, filed on Apr. 4, 2017, the disclosures of which are hereby incorporated by the references.

TECHNICAL FIELD

The present invention relates to a power transformer asset management device and a method thereof and, more specifically, to a power transformer asset management device and a method thereof, which enable establishing a maintenance plan and a replacement plan by evaluating physical performance, risk, and economic feasibility using the full cycle data of the power transformer, and establishing an optimal investment plan according to the investment priority, thereby making it possible to perform asset management of the power transformer, which maximizes the physical performance and economic value of the power transformer simultaneously.

BACKGROUND ART

A power transformer is a main transformer that supplies power to a distribution transformer by reducing extra-high voltage to high voltage, and is mainly used where a large load is required.

The life of such a power transformer has been reviewed on the basis of the life of insulation paper, which is a major internal component. The transformer surrounds the windings with insulation paper to maintain insulation between layers or wires of the windings, and the insulation paper is degraded by the heat generated by the windings. Since the temperature distribution inside the transformer is not uniform, the insulation paper at a hot spot in which the temperature is highest degrades most quickly. For this reason, the degradation of the insulation paper has been determined using the life span of the insulation paper that is at the hot spot. The degradation of the insulation paper can be calculated as "per unit of normal life" according to IEEE C57.91 using the Arrhenius reaction rate theory as shown in Equation 1 below.

$$\text{Per Unit Life} = 9.80 \times 10^{-18} \exp\left(\frac{15{,}000}{\theta_H + 273}\right) \quad \text{[Equation 1]}$$

However, the power transformer is not operated until the failure occurs because the ripple effect on the power system is very large in the event of a failure. That is, the power transformer should be replaced at a time point when the risk of failure increases due to inflow of lightning or surge in a state that the insulation paper is degraded.

In IEEE C57.91, the life span of the insulation paper is presented as shown in Table 1 below using the hot spot temperature 110° C. of the windings as the reference temperature in order to set the reference for the replacement time of the power transformer in the above Equation 1.

TABLE 1

| Life criterion | Insulation paper life (year) |
| --- | --- |
| Insulation paper residual tensile strength 50% | 7.42 |
| Insulation paper residual tensile strength 25% | 15.41 |
| Average degree of polymerization 200 | 17.12 |

In the above Table 1, the life criterion of the insulation paper is an example of the case where an insulation paper residual tensile strength is 50% or 25%, and an average polymerization degree is 200. Here, the hot spot temperature 110° C. is set as the reference temperature, assuming that the ambient temperature is 30° C., the average winding temperature rises by 65° C. at the rated load, and the temperature of the hot spot portion is 15° C. higher than the average winding temperature.

In addition, JEC 2200 of Japan defines that the insulation paper is expected to have a life span of 30 years or more by using the hot spot temperature 95° C. of the windings as the reference temperature in the Equation 1. Here, the hot spot temperature 95° C. is set as the reference temperature, assuming that the ambient temperature is 25° C., the average winding temperature rises by 55° C. at the rated load, and the temperature of the hot spot portion is 15° C. higher than the average winding temperature. Currently, Korea recognizes the life span of the power transformer as 30 years on the basis of JEC 2200 of Japan. According to Equation 1, the life span of insulation paper according to the hot spot temperature is calculated as shown in Table 2 below.

TABLE 2

| Load [MVA] | Hot Spot[° C.] | Life span[year] |
| --- | --- | --- |
| 20(100%) | 110 | 7.42 |
| 18(90%) | 99 | 23.67 |
| 16(80%) | 88 | 77.76 |
| 14(70%) | 78 | 274.69 |
| 12(60%) | 67 | 1,050.21 |
| 10(50%) | 56 | 4,379.42 |
| 8(40%) | 46 | 20,093.00 |
| 6(30%) | 35 | 102,439.53 |
| 4(20%) | 24 | 586,961.65 |

However, the actual power transformer is rarely operated at the rated load. In Table 2, for example, when the load factor is 70%, the life span of the insulation paper is calculated as 274 years. These calculations are not realistic and are difficult to apply to the field.

The life criterion of the insulation paper in Table 1 is not only a reference for the replacement of the power transformer, but is only one example of the insulation paper residual tensile strength or average polymerization degree.

Therefore, each power company has to separately set the replacement criterion of the power transformer, but does not establish a specific replacement plan and replacement criterion because it is difficult to establish the basis for determining the replacement criterion.

Accordingly, each power company is trying to prevent uninterrupted power by performing a time-based maintenance that allows the transformer to be operated until a failure occurs only by performing the maintenance based on a normal inspection, a detailed inspection, and a dissolve gas analysis, a partial discharge measurement on the power transformer, and by installing preventive diagnosis systems such as a dissolved gas analysis device, a partial discharging measuring device (electrical, ultrasonic, UHF), a bushing monitoring device, and an OLTC monitoring device in the power transformer to monitor the danger status online.

As described above, according to the method of performing the time-based maintenance or the method of installing the preventive diagnosis system for monitoring, there are disadvantages that it is impossible to evaluate the physical performance and risk of the power transformer and thus to establish a replacement plan, and it is impossible to evaluate the economics of the power transformer and thus to establish an optimal maintenance plan and investment plan.

DISCLOSURE

Technical Problem

An objective of the present invention to provide a power transformer asset management device and a method thereof, which enable establishing a maintenance plan and a replacement plan by evaluating physical performance, risk, and economic feasibility using the full cycle data of the power transformer, and establishing an optimal investment plan according to the investment priority, thereby making it possible to perform asset management on the power transformer, which maximizes the physical performance and economic value of the power transformer simultaneously.

Technical Solution

A power transformer asset management device according to an embodiment of the present invention includes: a full cycle database managing full cycle data of a power transformer; a physical performance evaluation unit performing physical performance evaluation that calculates a health index by analyzing and weighting life information, a failure ratio, an operation history, and status information of a preventive diagnosis system in the power transformer from the full cycle data; a risk evaluation unit performing risk evaluation by generating a risk matrix using the physical performance evaluation result; an economic evaluation unit performing economic evaluation by evaluating costs over a full cycle of the power transformer; and an asset management unit establishing an investment plan for replacing the power transformer according to a maintenance priority of the power transformer determined using the physical performance evaluation result, the risk evaluation result, and the economic evaluation result.

The full cycle data may be constructed with centralized database by integrating installation data, operation data, failure/replacement/disposal data, maintenance data, and preventive diagnosis data of the power transformer.

The installation data may include data related to a production year, a manufacturer, a transformer constant, a rated voltage, a rated capacity, a type of insulation paper, a bushing type (production year, manufacturer), an OLTC type (production year, manufacturer), a cooling method, no-load loss, design, manufacture, and transportation of the power transformer.

The operation data may include a current, an insulating oil temperature, a winding temperature, a hot spot temperature, a moisture, an outside temperature, cooling device operation information, a number of OLTC operations according to a load of the power transformer.

The maintenance data may include data related to initial inspection, normal inspection, detailed inspection, DGA, maintenance history, SFRA, and tan δ of the power transformer.

The preventive diagnosis data may include data measured by a dissolved gas analysis device, a partial discharge measurement device (electrical, ultrasonic, UHF), a bushing monitoring device, and an OLTC monitoring devices.

The life information of the power transformer may include information on a characteristic life, an average life span, a life loss, and a remaining life of the power transformer.

The physical performance evaluation unit may select only failure data related to a life span of the power transformer, excluding data due to trouble or malfunction, from among the failure/replacement/disposal data stored in the full cycle database, and then selects an optimal life distribution through a goodness-of-fit test to calculate the characteristic life.

The physical performance evaluation unit may calculate a failure ratio curve using failure data stored in the full cycle database of the power transformer, calculates a wearout period from the failure ratio curve, predicts a time point when the failure ratio increases and thus the risk increases from the failure ratio curve, and calculates the average life span using the time point when the risk increases.

The physical performance evaluation unit may calculate a life loss of a load per unit time according to the operation history of the power transformer and then calculates a total loss life by accumulating the life loss per unit time over an operation period of the power transformer, and then obtain a life loss rate per unit time by dividing the total loss life by the operation period, thereby obtaining an order of the life loss rates for the entire power transformers, and in the order of the life loss rates, a replacement life may be determined so that the power transformer of which the life loss rate is 50% on average is replaced at the average life span, the power transformer of which the life loss rate is more than the average is replaced shorter than the average life, and the power transformer of which the life loss rate is less than the average is replaced longer than the average life span.

The life loss per unit time may be calculated using a hot spot temperature according to the load, and the hot spot temperature according to the load satisfies $\theta_H = 1.066L + 3.0472$ (where L is an amount of the load).

The physical performance evaluation unit may determine the remaining life by reflecting the number of operating years of the power transformer in a replacement life.

The physical performance evaluation unit may calculate the health index by weighting the life information, the failure ratio, the operation history, and the status information of the preventive diagnosis system, and the weights are distributed so that a sum of each parameter affects a part or all depending on a state of each parameter.

The risk evaluation unit may evaluate the risk by generating the risk matrix using the physical performance evaluation result, importance of failure, severity of failure, and a frequency of failure.

The risk matrix may consist of an axis representing an impact (i.e., importance and severity) due to the failure of the power transformer and an axis representing the frequency (i.e., likelihood) of failure for the failure of the power transformer.

The impact due to the failure may include an impact on safety of a person, an impact on finances, an impact on a reliability, and an impact on an environment.

The frequency of failure for the failure may include a likelihood of occurring once in a specific year or a likelihood of occurring within one year.

The economic evaluation unit may evaluate a purchasing cost, an installation cost, an operating cost, an inspection cost, a repair cost, an improvement cost, a renewal cost, and a replacement cost, a spare part acquisition cost, a loss cost due to failure, a power failure cost, and a cost associated with outside impacts (e.g., licensing impacts) over an entire life cycle in the power transformer.

The economic evaluation unit may include evaluating a correlation between the failure ratio of the power transformer and the inspection cost of the power transformer to most economically set a normal inspection period, a detailed inspection period, and a gas analysis period of the power transformer.

The asset management unit may establish a maintenance plan of the power transformer using any one of time based maintenance (TBM), condition based maintenance (CBM), and risk based maintenance (RBM), or a combination thereof.

The asset management unit may compare a result obtained by evaluating effects on maintenance histories of a normal inspection, a detailed inspection, and a DGA, with a wearout period obtained by calculating a failure ratio curve, thereby optimally selecting cycles of the normal inspection, the detailed inspection, and the DGA.

The asset management unit may analyze maintenance history data according to accessory faulty to calculate a failure ratio curve of the accessory, calculate a wearout period of the accessory to determine an average life and replacement life of each accessory, and reflect a budget situation of a company, thereby establishing the replacement plan.

The asset management unit may establish an optimal investment plan to maintain a stable investment and expenditure environment for the replacement time by adjusting the replacement time of a larger number of power transformers so that a budget is evenly distributed.

The asset management unit may determine an investment priority in consideration of influences due to the failure, such as characteristics of a load connected to the power transformer, characteristics of a system, measures against regulations, measures against increased demand, and the like.

The asset management unit may establish an investment priority in consideration of an influence on reliability of the power system and establishes short-term, medium-term and long-term investment plans according to the investment priority.

A power transformer asset management method according to an embodiment of the present invention includes: performing physical performance evaluation that calculates a health index by analyzing and weighting life information, a failure ratio, an operation history, and status information of a preventive diagnosis system in a power transformer from a full cycle data of the power transformer; performing risk evaluation by generating a risk matrix using the physical performance evaluation result; performing economic evaluation by evaluating costs over a full cycle of the power transformer; and establishing an investment plan for replacing the power transformer according to a maintenance priority of the power transformer determined using the physical performance evaluation result, the risk evaluation result, and the economic evaluation result.

Advantageous Effects

According to the present invention, it is possible to maximize the physical performance and economic value of the power transformer by evaluating physical performance, risk, and economics using the full cycle data of the power transformer to establish an optimal replacement plan and investment priority.

In addition, the present invention can prevent a power failure in the national critical facilities due to the failure of the aging power transformer, whereby it is possible to reduce the maintenance cost.

In addition, according to the present invention, there are advantages that it is possible to improve the system reliability by reducing the risk of failure by evaluating the remaining life of the aging power transformer, and to prevent failure and extend the life span by performing timely maintenance on the power transformer.

In addition, the present invention has an advantage that the operating efficiency can be maximized by determining the optimum replacement time of the aging power transformer. That is, according to the present invention, it is possible to establish a mid-to-long term operation plan based on reliability and economy for the power transformer.

In addition, the present invention has an advantage that an optimal investment plan can be established to distribute the budget evenly despite of a large increase in the amount of replacement targets.

MODE FOR INVENTION

Figure 1:
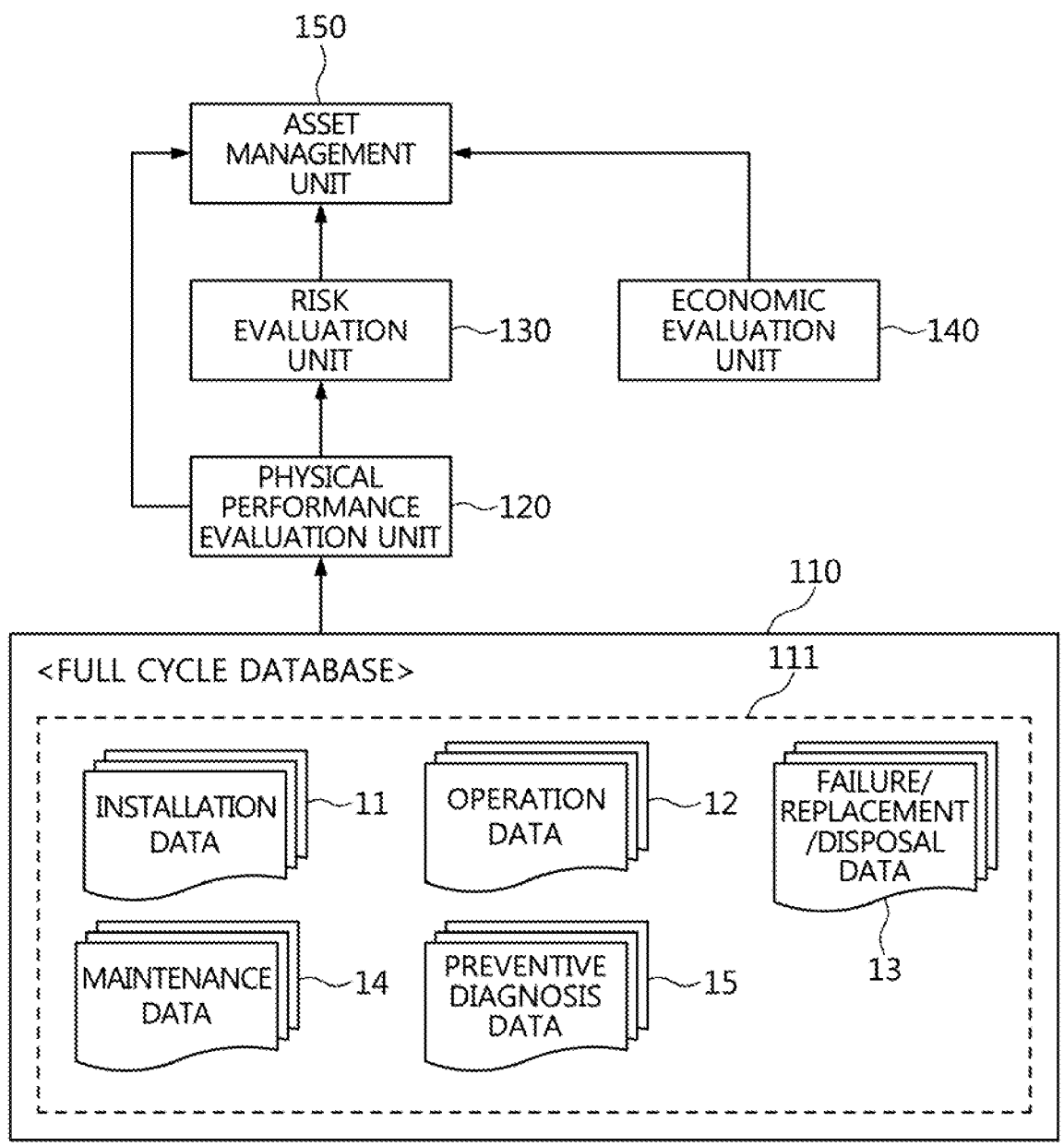
FIG. 1 is a view illustrating a power transformer asset management device according to an embodiment of the present invention.

For a better understanding of the present invention, a preferred embodiment of the present invention will be described with reference to the accompanying drawings. The embodiments of the present invention can be modified in various forms, and the scope of the present invention should not be construed as being limited to the embodiments described in detail below. The present embodiments are provided to enable those skilled in the art to more fully understand the present invention. Therefore, the shapes and the like of the elements in the drawings can be exaggeratedly expressed to emphasize a clearer description. It should be noted that the same components are denoted by the same reference numerals in the drawings. Detailed descriptions of well-known functions and constructions which may be unnecessarily obscured by the gist of the present invention are omitted.

In addition, the term "unit" as used herein refers to a hardware component, such as software, FPGA or ASIC, and "unit" plays certain roles. However, "unit" is not meant to be limited to software or hardware. The "unit" may be configured to be in an addressable storage medium and may be configured to play one or more processors. Thus, as an example, a "unit" refers to components such as software components, object-oriented software components, class components, and task components, processes, functions, properties, procedures, subroutines, segments of program code, drivers, firmware, microcode, circuits, data, databases, data structures, tables, arrays and variables. The functionality provided within the components and the "units" may be combined into a smaller number of components and "units" or further separated into additional components and "units". (Preliminary correction will be added)

FIG. 1 is a view illustrating a power transformer asset management device according to an embodiment of the present invention.

As shown in FIG. 1, a power transformer asset management device (hereinafter, referred to as an "asset management device") 100 according to an embodiment of the present invention provides an asset management function which is to maximize the physical performance and economic value of a power transformer simultaneously. Here, the power transformer refers to a power transformer that is provided to surround the windings installed around an iron core with insulation paper to maintain insulation between layers or wires of the windings, and is sealed by filling insulating oil to ensure insulation performance and cooling performance.

Degradation of the insulation paper is an important factor that determines the life span of a power transformer, but is not the only factor. In practice, power transformers operating in the field are replaced not only dependent on physical performance, but also due to changes in technical, social and economic operating conditions. For example, the power transformer may be often replaced by a power transformer having a larger capacity as the load increases, or by a flame retardant transformer to prevent fire as technology advances. In addition, there are many cases where the power transformer is replaced depending on management and operation policy of the power transformer, such as, degradation of accessories including enclosures, bushings, and on load tap changer (OLTC), increases in excessive maintenance costs, increased regulations according to environmental impact, manufacturer support, safety, and reliability.

Therefore, the asset management device 100 establishes an asset management method having an optimal replacement criterion based on reliability and economics, by evaluating the life span using data such as installation, operation, failure, maintenance, and preventive diagnosis, etc. of the power transformer, by calculating the health index by weighting the life information, failure ratio, operation history, and status information of the preventive diagnosis system to evaluate the physical performance, by evaluating the risk by creating a risk matrix using the physical performance evaluation result, the importance of the failure, the severity of the failure, and the frequency of the failure, and by evaluating maintenance costs, failure costs, and social costs.

In other words, the asset management device 100 evaluates the physical performance and risk of the power transformer and evaluates the economics based on the costs over the entire life cycle, to establish an optimal maintenance plan and replacement plan for asset management of the power transformers and establish short, medium, and long term investment plans according to investment priorities.

The asset management device 100 includes a full cycle database 110, a physical performance evaluation unit 120, a risk evaluation unit 130, an economic evaluation unit 140, and an asset management unit 150.

The full cycle database 110 integrates full cycle data 111 over the installation, operation, and disposal of the power transformer, that is, installation data 11, operation data 12, failure/replacement/disposal data 13, maintenance data 14, preventive diagnosis data 15, etc., thereby constructing a centralized database. Herein, the full cycle database 110 stores and manages data necessary for asset management of the power transformer as big data in the form of large-scale structured and unstructured data.

Specifically, the installation data 11 includes a production year, a manufacturer, a transformer constant, rated voltage, rated capacity, a type of an insulation paper, a bushing type (production year, manufacturer), an OLTC type (production year, manufacturer), a cooling method, no-load loss, etc. of the power transformer. In addition, the installation data 110 may include data related to design, manufacture, and transportation.

The operation data 12 includes a current according to the load, insulation oil temperature, winding temperature, hot spot temperature, moisture, outside temperature, cooling device operation information, the number of OLTC operations, and the like.

The failure/replacement/disposal data 13 includes failure data, replacement data, discard data, failure cause, discard cause, and the like.

The maintenance data 14 includes initial inspection, normal inspection, detailed inspection, dissolved gas analysis (DGA), maintenance history, sweep frequency response analysis (SFRA), tangent delta (tan δ), and the like.

The preventive diagnosis data 15 includes data and the like measured in a dissolved gas analysis device, a partial discharge measurement device, a bushing monitoring device, an OLTC monitoring device. The partial discharge measurement device may include an electric, ultrasonic or UHF measurement device.

The physical performance evaluation unit 120 analyzes the life information of the power transformer using the full cycle data 111 of the power transformer, and then calculates the health index by weighting the life information, failure ratio, operation history, and the status information of the preventive diagnosis system, thereby evaluating the physical performance of the power transformer.

First, the physical performance evaluation unit 120 statistically processes failure/replacement/disposal data 13 stored in the full cycle database 110 to calculate a characteristic life, an average life, a life loss, and a residual life. This will be described with reference to FIG. 2.

The physical performance evaluation unit 120 selects only the failure data related to the life of the power transformer, excluding data due to trouble or malfunction, from among the failure/replacement/disposal data 13 stored in the full cycle database 110, that is, failure data, replacement data, and disposal data.

The physical performance evaluation unit 120 selects an optimal life distribution (e.g., Weibull distribution) through a goodness-of-fit test of the failure data, in order to calculate the characteristic life of the power transformer from the failure data. Herein, the physical performance evaluation unit 120 calculates the characteristic life for the optimal life distribution of the failure data (S201). Here, the characteristic life means 63.2% of data having a Weibull distribution.

Next, the physical performance evaluation unit 120 calculates a failure ratio curve using failure data stored in the full cycle database 110, calculates a wearout period from the failure ratio curve, predicts the time point at which the risk increases due to increases in the failure ratio from the failure ratio curve, and calculates the average life using the time point when the risk increases (S202 and S203). Herein, the physical performance evaluation unit 120 may calculate an operating age when a failure occurs in the power transformer, from the failure data through the failure ratio curve, and calculate a failure ratio for each year by dividing the power transformer operated at the corresponding age. The failure ratio thus calculated may show a time point that increases with the number of operating years, which is called a wearout period.

It is not desirable to replace the power transformer on the basis of the characteristic life because the ripple effects on society and the economic losses are large in the event of a failure. This is because the characteristic life means a time point when the risk of failure occurs in 63.2% of the operating power transformers.

Therefore, the average life span of the power transformer should be selected by evaluating the characteristic life and a time point when the failure ratio increases suddenly or indicates a specific failure ratio (e.g., 5%, 10%, etc.), and the like. Herein, the determination of the time point of sudden increase in the failure ratio is performed by evaluating the physical performance, risk, and economics of the power transformer.

Next, the physical performance evaluation unit 120 calculates the remaining life of the power transformer. Herein, the physical performance evaluation unit 120 reflects, in the residual life, the life loss determined according to how the load has been applied over the entire life cycle of the power transformer (operation history).

According to the present invention, the average life span is set using the failure data. Since replacing power transformers too soon increases the replacement cost, and replacing power transformers too late increases the risk of failure, bulk replacement based on average life is not recommended.

The power transformer may be replaced sooner than the average life when the load is applied frequently, and may be replaced later than the average life when the load is applied less, on the basis of the average life. In other words, the life loss is obtained according to the load history applied for the entire power transformer during operation, then the power transformer of which the life loss rate is 50% on average is replaced at the average life, and the power transformer of which the life loss rate is more than the average is replaced shorter than the average life span, and the power transformer of which the life loss rate is less than the average is replaced longer than the average life span.

Figure 2:
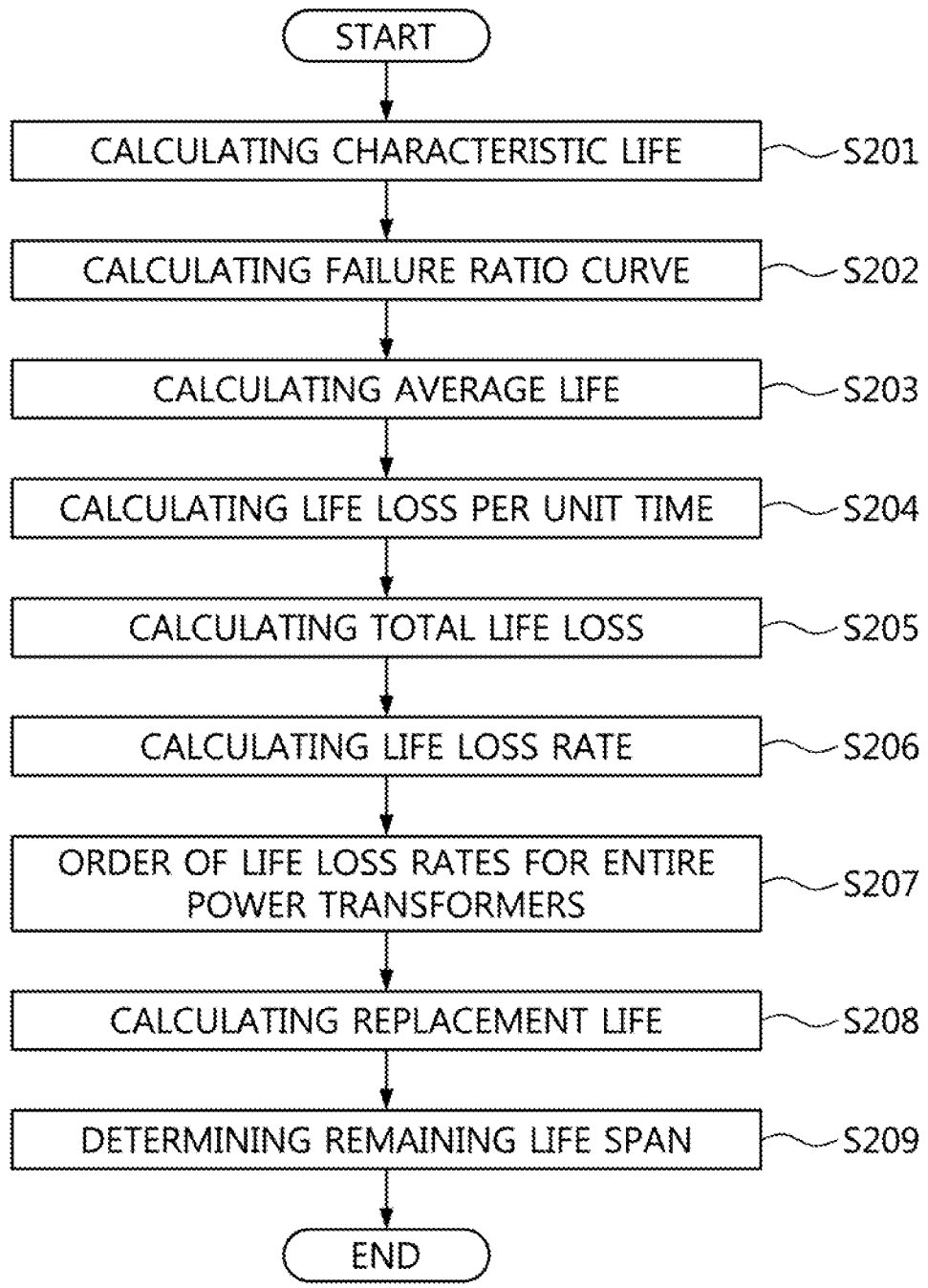
FIG. 2 is a view illustrating a process of calculating the life loss of a power transformer according to an embodiment of the present invention.

Referring to FIG. 2, in order to obtain the life loss according to the load history, a life loss $F_A$ according to the load per unit time may be obtained as shown in Equation 2 below (S204).

$$F_A = e\left(\frac{15{,}000}{383} - \frac{15{,}000}{\theta_H + 273}\right) \quad \text{[Equation 2]}$$

Equation 2 shows degradation per unit time according to the hot spot temperature. Since the hot spot temperature is determined by the load, the life loss due to the load history is equal to the life loss due to the hot spot temperature. The load data may be recorded in units of one hour or one minute. Therefore, the above Equation 2 shows the degradation per unit time in which the load data is recorded.

In order to calculate the life loss $F_A$ according to the load per unit time in Equation 2, it is necessary to calculate a hot spot temperature $\theta_h$ according to the load. According to the present invention, the hot spot temperature according to the load is obtained as in Equation 3 using data measured by an optical fiber sensor.

$$\theta_H = 1.066L + 3.0472 \quad \text{[Equation 3]}$$

Herein, L is an amount of load.

When the life loss $F_A$ per unit time is accumulated as in Equation 4 with respect to the operation period of the power transformer, a total life loss $F_{AT}$ may be calculated (S205).

$$F_{AT} = \sum_{n=1}^{N} F_A \Delta t_n \quad \text{[Equation 4]}$$

The total life loss $F_{AT}$ is divided by the operation period to obtain a life loss rate per unit time (S206), and the order of the life loss rates is obtained for the entire power transformers (S207).

Herein, in the order of the life loss rates, the power transformer of which the life loss rate is 50% on average is replaced at the average life. The power transformer of which the life loss rate is more than the average is replaced shorter than the average life span. The power transformer of which the life loss rate is less than the average is replaced longer than the average life span.

The number of years in life span in which the power transformer is replaced shorter or longer than the average life span is determined strategically according to the replacement strategy of the power transformer owner. According to an embodiment, when the average life span is set to 35 years, the replacement life of the power transformer having the greatest life loss rate may be determined as 25 years, and the replacement life of the power transformer having the lowest life loss rate may be determined as 45 years.

As described above, the life when replacing the transformers according to the order of life loss rates according to the load history is called a replacement life span (S208), and the remaining life span may be determined by reflecting the number of operating years of the power transformer in the replacement life span (S209).

Next, the physical performance evaluation unit 120 calculates the health index by weighting the life information, failure ratio, operation history, and status information of the preventive diagnosis system.

For example, the health index may give a weight of 50% to the life information, and give weights of 30% to the number of operating years of the transformer, 10% to the operating history, and 10% to the status information of the preventive diagnostic system in the failure ratio curve.

Here, the weights are not uniformly distributed such that a sum of each full cycle data (parameters) is 100, but distributed to affect a part or the whole depending on the state of each full cycle data (parameters). For example, when acetylene ($C_2H_2$) gas is generated below the level that requires attention, the weights are partially given and applied to affect a part. Meanwhile, when acetylene ($C_2H_2$) gas is generated three times or more above the level that requires attention, the weights are given on the whole and applied to affect the whole so that the internal inspection of the power transformer may be performed. In addition, when the gas analysis indicates a risk, the weights may be given to immediately perform inspection within the power transformer.

The risk evaluation unit 130 evaluates the risk by generating a risk matrix using the criticality of the failure, the severity of the failure, the frequency of the failure in the power transformer, which may be identified from the physical performance evaluation unit 120. Here, the risk matrix consists of an axis representing the impact (i.e., importance and severity) on the failure of the power transformer and an axis representing the frequency (i.e., likelihood) of the failure in the power transformer.

For example, a power transformer for supplying power to semiconductor factories, steel mills, and chemical factories has a high impact due to a failure, so that the impact may be set to the highest level of importance. As such, each step may be set according to the degree of impact on a failure of the power transformer.

The impact due to a failure may be defined as impact on the safety of the person, impact on finances, impact on reliability, and impact on the environment. In addition, a likelihood of failure in the power transformer may be represented as the frequency of failure from the physical performance evaluation unit 120.

The occurrence frequency is defined as a likelihood of occurring once in a particular year or a likelihood of occurring within one year. Herein, the occurrence frequency may be designated as a failure range of the minimum-to-maximum frequency (e.g., less than once in 10 years).

The economic evaluation unit 140 evaluates the economics by evaluating the costs of the power transformer over the full cycle. Here, the costs over the entire life cycle includes the purchasing cost, the installation cost, the operating cost, the inspection cost, the repair cost, the improvement cost, the renewal cost, the replacement cost, the cost of obtaining spare parts, the loss cost due to failure, the cost of power failure, and the cost associated with outside impacts (e.g., licensing impacts) in the power transformer. Herein, the economic evaluation unit 140 converts the costs over the entire life cycle to the present value using inflation and a discount rate.

When the economic evaluation unit 140 evaluates the various costs of the power transformer as described above, the evaluation results may be reflected in the maintenance and replacement strategy of the power transformer. For example, when a failure occurs in a transformer, the repair cost at the site, the repair cost at the factory (including transportation cost), and the purchasing cost of a new power transformer are compared, to determine whether to repair the power transformer on site, repair the power transformer at the factory, or discard the power transformer and then purchase a new power transformer.

In addition, the economic evaluation unit 140 may evaluate the correlation between the failure ratio and the inspection cost of the power transformer, thereby setting normal inspection, detailed inspection, and gas analysis cycles of the power transformer in a most economic manner.

An asset management unit 150 may establish an optimal maintenance plan and replacement plan of the power transformer and establish a short-term, medium-term, and long-term investment plan according to the investment priority, by using a physical performance evaluation result of the physical performance evaluation unit 120 (i.e., characteristic life, remaining life, failure ratio, impact due to a failure, health score, etc.), a risk evaluation result of the risk evaluation unit 130 (i.e., risk, etc.), and an economic evaluation result of the economic evaluation unit 140 (i.e., costs over the entire cycle, etc.). Here, the optimal maintenance plan establishment includes comparing a result obtained by evaluating the effects on the maintenance history of normal inspection, detailed inspection, and DGA, with a wearout period according to the failure ratio curve calculation to optimally select the cycles of normal inspection, detailed inspection, and DGA. In addition, the optimal maintenance plan establishment may include selecting the optimal maintenance method by analyzing the DGA result and the internal inspection result.

In addition, the asset management unit 150 may establish the maintenance plan of the power transformer using any one of time based management (TBM), condition based management (CBM), and risk based maintenance (RBM) or a combination thereof as needed when establishing the optimal maintenance plan.

As described above, the replacement plan establishment may include optimally determining the replacement time of the power transformer using the physical performance evaluation result, the risk evaluation result, and the economic evaluation result using the full cycle data of the power transformer.

For example, it is possible to analyze the remaining life and replacement life from the full cycle data of the power transformer, perform risk evaluation based on the criticality of the failure, the severity of the failure, and the frequency of failure on the basis of the physical performance evaluation according to the life information and the status information of the preventive diagnosis system, and reflect the budget situation of the company, thereby establishing the replacement plan in such a manner as.

In addition, it is possible to analyze maintenance history data according to accessory failures to calculate the failure ratio curve of the accessories, calculate a wearout period of the accessories to determine the average life and replacement life of each accessory, and reflect the budget situation of the company, thereby establishing the replacement plan.

Since a large budget is involved when a large number of power transformers are replaced at the same time according to the calculation of the replacement life of each power transformer, the investment plan establishment may include an investment optimization method of adjusting the replacement time of the power transformers so that the budget is evenly distributed. This is necessary to prevent a case where the power transformers installed intensively at the time of economic development may be replaced at the same time, requiring a large budget.

Therefore, the asset management unit 150 may establish the optimal investment plan capable of maintaining a stable investment and spending environment for the replacement time of the power transformer.

In particular, the asset management unit 150 may consider the impact due to the failure of the power transformer to determine the priority of maintenance. In this case, the load characteristics connected to the power transformer (e.g., critical loads such as hospitals), the characteristics of the system to which the power transformer is connected (e.g., residential, industrial, etc.), measures against regulations, measures against increased demand, other items (i.e., increased demand, aging equipment, capacity increase, safety issues) are reviewed.

In addition, the asset management unit 150 may establish an investment plan in consideration of the effect on the reliability of the power system in a long term perspective. In this case, investment priorities may be determined, and it is possible to establish short-term, medium-term, and long-term investment plans according to the investment priorities.

The effect on the reliability of the power system may be considered the loss time of the customer, system average interruption duration index (SAIDI), system average interruption frequency index (SAIFI), the number of events, the availability and unavailability based on power outage (i.e., average annual availability, transmission continuity), power quality (voltage magnitude, change rate, voltage imbalance, harmonics), failover (line failure, number of failures/outages), financial indicators, and the like. Financial indicators include pre-tax and post-tax net income, credit rating, interest, tax, earnings before interest, tax, depreciation and amortization (EBITDA), operating cash, operating/maintenance/management costs, return on equity, cash flow, economic value added, operating income, liabilities, capital ratios, capital raising ratios, net profit ratios, and the like.

Figure 3:
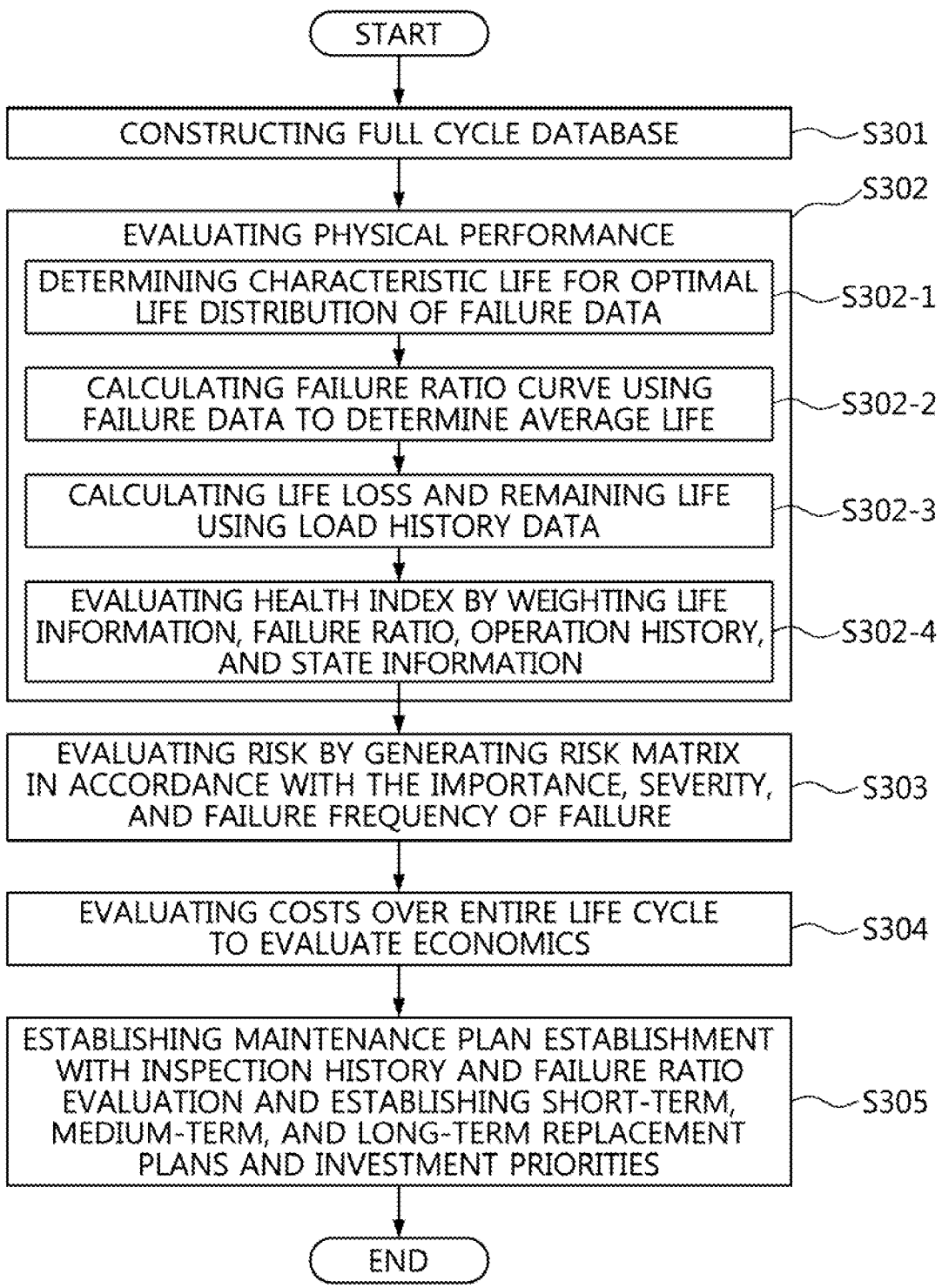
FIG. 3 is a view illustrating a power transformer asset management method according to an embodiment of the present invention.

FIG. 3 is a diagram illustrating a power transformer asset management method according to an embodiment of the present invention.

The asset management device 100 integrates the full cycle data 111 of the power transformer over the installation, operation, and disposal of the power transformer to construct a centralized database (S301). Here, the full cycle data 111 of the power transformer includes installation data 11, operation data 12, failure/replacement/disposal data 13, maintenance data 14, preventive diagnosis data 15, and the like.

Then, the asset management device 100 evaluates the physical performance (health index) of the power transformer, by analyzing the life information of the power transformer and by calculating the health score by weighting the life information and failure ratio, operation history, and status information of the preventive diagnosis system, (S302).

In detail, the asset management device 100 may statistically process the failure data to determine a characteristic life and a failure ratio for an optimal life distribution (S302-1). In addition, the asset management device 100 calculates a failure ratio curve using the failure data to determine an average life (S302-2), and calculates a life loss and a remaining life using the load history data (S302-3). The asset management device 100 evaluates the health index by weighting the life information, the failure ratio, the operation history, and the state information of the preventive diagnosis system (S302-4).

Then, the asset management device 100 evaluates the risk by generating a risk matrix in accordance with the importance, severity, and the frequency of failure checked for the failure of the power transformer (S303).

In addition, the asset management device 100 evaluates the costs over the entire life cycle of the power transformer, thereby evaluating the economics (S304).

On the other hand, the asset management device 100 establishes a maintenance plan establishment with inspection history and failure ratio evaluation for a plurality of power transformers installed in the power system, and establishes short-term, medium-term, and long-term replacement plans and investment priorities (S305).

The method according to some embodiments may be embodied in the form of program instructions that may be executed by various computer means and recorded on a computer readable medium. The computer readable medium may include program instructions, data files, data structures, etc. alone or in combination. Program instructions recorded on the media may be those specially designed and constructed for the purposes of the present invention, or they may be of the kind well-known and available to those having skill in the computer software arts. Examples of computer-readable recording media include magnetic media such as hard disks, floppy disks, and magnetic tape, optical media such as CDROMs, DVDs, and magnetic-optical such as floppy disks, and hardware devices specifically configured to store and execute program instructions, such as ROM, RAM, flash memory, and the like. Examples of program instructions include not only machine code generated by a compiler, but also high-level language code that can be executed by a computer using an interpreter or the like.

The embodiments of the present invention described above are merely exemplary, and those skilled in the art will appreciate that various modifications and equivalent other embodiments are possible therefrom. Therefore, it will be understood that the present invention is not limited only to the form mentioned in the above detailed description. Therefore, the true technical protection scope of the present invention will be defined by the technical spirit of the appended claims. It is also to be understood that the present invention includes all modifications, equivalents and substitutions within the spirit and scope of the invention as defined by the appended claims.

The invention claimed is:

1. A power transformer asset management device, comprising:
    a full cycle database managing full cycle data of a power transformer;
    a physical performance evaluation unit performing physical performance evaluation that calculates a health index by analyzing and weighting life information, a failure ratio, an operation history, and status information of a preventive diagnosis system in the power transformer from the full cycle data;
    a risk evaluation unit performing risk evaluation by generating a risk matrix using the physical performance evaluation result;
    an economic evaluation unit performing economic evaluation by evaluating costs over a full cycle of the power transformer; and
    an asset management unit establishing an investment plan for replacing the power transformer according to a maintenance priority of the power transformer determined using the physical performance evaluation result, the risk evaluation result, and the economic evaluation result,
    wherein the life information of the power transformer includes information on a characteristic life, an average life span, a life loss, and a remaining life of the power transformer,
    wherein the physical performance evaluation unit selects only failure data related to a life span of the power transformer, excluding data due to trouble or malfunction, from among the failure/replacement/disposal data stored in the full cycle database, and then selects an optimal life distribution through a goodness-of-fit test to calculate the characteristic life,
    wherein the physical performance evaluation unit calculates a failure ratio curve using failure data stored in the full cycle database of the power transformer, calculates a wearout period from the failure ratio curve, predicts a time point when the failure ratio increases and thus the risk increases from the failure ratio curve, and calculates the average life span using the time point when the risk increases,
    wherein the physical performance evaluation unit calculates a life loss of a load per unit time according to the operation history of the power transformer and then calculates a total loss life by accumulating the life loss per unit time over an operation period of the power transformer, and then obtain a life loss rate per unit time by dividing the total loss life by the operation period, thereby obtaining an order of the life loss rates for the entire power transformers, and in the order of the life loss rates, a replacement life is determined so that the power transformer of which the life loss rate is 50% on average is replaced at the average life span, the power transformer of which the life loss rate is more than the average is replaced shorter than the average life, and the power transformer of which the life loss rate is less than the average is replaced longer than the average life span, and wherein the physical performance evaluation unit determines the remaining life by reflecting the number of operating years of the power transformer in a replacement life.

2. The device of claim 1, wherein the full cycle data is constructed with centralized database by integrating installation data, operation data, failure/replacement/disposal data, maintenance data, and preventive diagnosis data of the power transformer.

3. The device of claim 2, wherein the installation data includes data related to a production year, a manufacturer, a transformer constant, a rated voltage, a rated capacity, a type of insulation paper, a bushing type including production year and manufacturer, an OnLoadTapChanger (OLTC) type including production year and manufacturer a cooling method, no-load loss, design, manufacture, and transportation of the power transformer.

4. The device of claim 2, wherein the operation data includes a current, an insulating oil temperature, a winding temperature, a hot spot temperature, a moisture, an outside temperature, cooling device operation information, a number of OnLoadTapChanger (OLTC) operations according to a load of the power transformer.

5. The device of claim 2, wherein the maintenance data includes data related to initial inspection, normal inspection, detailed inspection, Dissolved Gas Analysis (DGA), maintenance history, Sweep Frequency Response Analysis (SFRA), and tan δ of the power transformer.

6. The device of claim 2, wherein the preventive diagnosis data includes data measured by a dissolved gas analysis device, a partial discharge measurement device, a bushing monitoring device, and an OnLoadTapChanger (OLTC) monitoring devices.

7. The device of claim 1, wherein the life loss per unit time is calculated using a hot spot temperature according to the load, and the hot spot temperature according to the load satisfies $\theta_H = 1.066L + 3.0472$, where L is an amount of the load.

8. The device of claim 1, wherein the physical performance evaluation unit calculates the health index by weighting the life information, the failure ratio, the operation history, and the status information of the preventive diagnosis system, and the weights are distributed so that a sum of each parameter affects a part or all depending on a state of each parameter.

9. The device of claim 1, wherein the risk evaluation unit evaluates the risk by generating the risk matrix using the physical performance evaluation result, importance of failure, severity of failure, and a frequency of failure, wherein the risk matrix consists of an axis representing an impact including importance and severity due to the failure of the power transformer and an axis representing the frequency of failure for the failure of the power transformer, wherein the impact due to the failure includes an impact on safety of a person, an impact on finances, an impact on a reliability, and an impact on an environment, and wherein the frequency of failure for the failure includes a likelihood of occurring once in a specific year or a likelihood of occurring within one year.

10. The device of claim 1, wherein the economic evaluation unit evaluates a purchasing cost, an installation cost, an operating cost, an inspection cost, a repair cost, an improvement cost, a renewal cost, and a replacement cost, a spare part acquisition cost, a loss cost due to failure, a power failure cost, and a cost associated with outside impacts over an entire life cycle in the power transformer.

11. The device of claim 1, wherein the economic evaluation unit includes evaluating a correlation between the failure ratio of the power transformer and the inspection cost of the power transformer to most economically set a normal inspection period, a detailed inspection period, and a gas analysis period of the power transformer.

12. The device of claim 1, wherein the asset management unit establishes a maintenance plan of the power transformer using any one of time based maintenance (TBM), condition based maintenance (CBM), and risk based maintenance (RBM), or a combination thereof.

13. The device of claim 12, wherein the asset management unit compares a result obtained by evaluating effects on maintenance histories of a normal inspection, a detailed inspection, and a Dissolved Gas Analysis (DGA), with a wearout period obtained by calculating a failure ratio curve, thereby optimally selecting cycles of the normal inspection, the detailed inspection, and the DGA.

14. The device of claim 12, wherein the asset management unit analyzes maintenance history data according to accessory faulty to calculate a failure ratio curve of the accessory, calculates a wearout period of the accessory to determine an average life and replacement life of each accessory, and reflects a budget situation of a company, thereby establishing the replacement plan.

15. The device of claim 1, wherein the asset management unit establishes an optimal investment plan to maintain a stable investment and expenditure environment for the replacement time by adjusting the replacement time of a larger number of power transformers so that a budget is evenly distributed.

16. The device of claim 1, wherein the asset management unit determines an investment priority in consideration of influences due to the failure, such as characteristics of a load connected to the power transformer, characteristics of a system, measures against regulations, measures against increased demand, and the like.

17. The device of claim 1, wherein the asset management unit establishes an investment priority in consideration of an influence on reliability of the power system and establishes short-term, medium-term and long-term investment plans according to the investment priority.

18. A power transformer asset management method, comprising:

performing physical performance evaluation that calculates a health index by analyzing and weighting life information, a failure ratio, an operation history, and status information of a preventive diagnosis system in a power transformer from a full cycle data of the power transformer;

performing risk evaluation by generating a risk matrix using the physical performance evaluation result;

performing economic evaluation by evaluating costs over a full cycle of the power transformer; and establishing an investment plan for replacing the power transformer according to a maintenance priority of the power transformer determined using the physical performance evaluation result, the risk evaluation result, and the economic evaluation results, wherein the physical performance evaluation unit selects only failure data related to a life span of the power transformer, excluding data due to trouble or malfunction, from among the failure/replacement/disposal data stored in the full cycle database, and then selects an optimal life distribution through a goodness-of-fit test to calculate the characteristic life, wherein the physical performance evaluation unit calculates a failure ratio curve using failure data stored in the full cycle database of the power transformer, calculates a wearout period from the failure ratio curve, predicts a time point when the failure ratio increases and thus the risk increases from the failure ratio curve, and calculates the average life span using the time point when the risk increases, wherein the physical performance evaluation unit calculates a life loss of a load per unit time according to the operation history of the power transformer and then calculates a total loss life by accumulating the life loss per unit time over an operation period of the power transformer, and then obtain a life loss rate per unit time by dividing the total loss life by the operation period, thereby obtaining an order of the life loss rates for the entire power transformers, and in the order of the life loss rates, a replacement life is determined so that the power transformer of which the life loss rate is 50% on average is replaced at the average life span, the power transformer of which the life loss rate is more than the average is replaced shorter than the average life, and the power transformer of which the life loss rate is less than the average is replaced longer than the average life span, and wherein the physical performance evaluation unit determines the remaining life by reflecting the number of operating years of the power transformer in a replacement life.

* * * * *